United States Patent [19]
Veneruso

[11] Patent Number: 5,159,335
[45] Date of Patent: Oct. 27, 1992

[54] SWITCHED CAPACITANCE AUTOMATIC METER READING DEVICE

[75] Inventor: John E. Veneruso, Hurst, Tex.

[73] Assignee: Siecor Corporation, Hickory, N.C.

[21] Appl. No.: 661,247

[22] Filed: Feb. 26, 1991

Related U.S. Application Data

[63] Continuation-in-part of Ser. No. 467,187, Jan. 19, 1990, abandoned.

[51] Int. Cl.[5] .............................................. G08C 19/10
[52] U.S. Cl. .......................... 340/870.02; 340/870.37; 340/870.07
[58] Field of Search ................... 340/870.37, 870.02, 340/870.07; 364/480, 556

[56] References Cited

U.S. PATENT DOCUMENTS

| | | | |
|---|---|---|---|
| 4,007,454 | 2/1977 | Cain et al. | 340/870.07 |
| 4,165,505 | 8/1979 | Cain et al. | 340/870.07 |
| 4,429,308 | 1/1984 | Shankle | 340/870.37 |
| 4,433,332 | 2/1984 | Wason | 340/870.37 |
| 4,477,860 | 10/1984 | Wason et al. | 340/870.37 |
| 4,633,249 | 12/1986 | Sassaki | 340/870.37 |
| 4,743,902 | 5/1988 | Andermo | 340/870.37 |
| 4,924,407 | 5/1990 | King et al. | 340/870.37 |
| 5,030,950 | 7/1991 | Veneruso | 340/870.02 |

OTHER PUBLICATIONS

E. R. Hnatek, "Applications of Linear Integrated Circuits," John Wiley & Sons, New York, May 1975, pp. 59–61.
Microelectronics Digital & Analog Circuits & Systems, Jacob Millman, McGraw-Hill Publishers, 1979.
Motorola Linear Integrated Circuits, Series C, 1979.
Electronic Devices and Circuits, Discrete & Integrated, M. S. Ghausi, Holt, Rinehart & Winston, 1985.
ME10 Universal Monolithic Dual Switched Capacitor Filter, National Semiconductor Corporation, ME10.

Primary Examiner—Donald J. Yusko
Assistant Examiner—Michael Krakovsky
Attorney, Agent, or Firm—Roy B. Moffitt

[57] ABSTRACT

A humidity and temperature resistant apparatus for determining the orientation of a rotatable meter hand relative to a dial spaced apart from a meter hand that creates and depletes a charge between a center electrode, a meter hand, and an outer electrode (a pad) very rapidly to transport electrons through a resistor capacitor combination, attached to a positive power supply, whereby the average current drawn through the resistor capacitor combination creates a voltage across the resistor capacitor combination that corresponds proportionally to the magnitude of the capacitance being measured.

12 Claims, 9 Drawing Sheets

SWITCHED CAPACITANCE AUTOMATIC METER READING DEVICE

CROSS REFERENCE TO RELATED INVENTIONS

This application is a continuation-in-part of U.S. patent Ser. No. 07/467,187, filed Jan. 19, 1990 entitled Improved Switched Capacitance Automatic Meter Reading Device, now abandoned.

BACKGROUND OF THE INVENTION

This invention relates to a Humidity and Temperature Resistant device for determining the position of a rotatable meter hand relative to a dial like that apparatus disclosed in my co-pending application entitled Switched Capacitance Automatic Meter Reading Device filed the 23rd day of October, 1989 having the Ser. No. of 07/425,702, now U.S. Pat. No. 5,030,950.

GENERAL DESDRIPTION OF THE PRIOR ART

A prior art remote meter reading device (see FIG. 3), sold by Siecor Corporation under Part Number SE200, uses a high pass filter technique, otherwise known as a transimpedance amplifier to sense the position of a meter's hand. Once this is done, it encodes the reading and sends it over a cable in ASCII form to an interface device, like a TIU-100 (Telephone Interface Device also sold by Siecor Corporation) where the reading can be used for monitoring power usage and customer billing. It employs a four-layer PC Board (see FIG. 1) and a microprocessor, analog and digital circuitry and five dial-pad (excitable electrodes) arrangement (see FIG. 2). Each encoder dial is made up of ten pads (excitable electrodes), arranged around an inner ring, each pad coinciding with one of the ten meter hand positions. The excitable electrodes or pads and inner ring are made of copper PC board metalization connected to electronic circuitry, a receiver circuit. To sense the position of the meter hand, a pulse or waveform is generated and routed to a predetermined one of the ten pads on the dial being tested.

If the meter hand of this predetermined dial is located over the pad being tested, it acts like an antenna, i.e., it receives the signal sent to the pad, conducts it down its length toward the center of the dial and transmits it to the nearby inner ring (center electrode), which is spaced apart from the pad by five to twenty-five thousandths of an inch. The meter hand can also be looked upon as the middle plate of a three-plate capacitor, the other plates being the dial's pad and its inner ring. When the meter hand is over the pad being excited, the capacitor formed conducts the high frequency pulses to the inner ring (center conductor) while sharply attenuating lower frequencies, most of which are noise. Because the capacitance thus formed is small, the frequency corner (frequencies below the corner are attenuated and frequencies above the corner are passed) created by the capacitance and the first stage of an amplifier connected thereto is approximately 159 KHz. When the meter hand is not present, the frequency corner is approximately 640 KHz. When a meter hand is not over the pad being excited, only stray capacitance exists, through the PC board and the relatively long air path from the pad to the inner ring center conductor. This prior art encoder makes use of the difference in frequency corners by sending a signal of approximately 130 KHz to 175 KHz to the pad being measured or analyzed. If the meter hand is not there, the resultant signal output by the first stage of the high performance wide bandwidth amplifier is very small. If the meter hand is over the pad, the resultant signal is relatively large.

The above-identified prior art device employs a high pass filter or transimpedance measurement technique. Under some circumstances, this technique works best if used in coordination with at least one operational amplifier (op-amp) per dial because (a) the signal that is passed through such a small capacitance, like that of an excitable electrode center electrode and meter hand, before being amplified is weak and thus difficult to be route first through any other devices such as a multiplexer, and (b) a microprocessor used with the prior art device senses only one dial at a time because, for cost reasons, all like numbered pads on the five dials are connected together. In addition to the one op-amp per dial, an additional one or more amplifying stages are required to boost the signal up to measurable levels. The total power available to run the prior art encoder is limited to five milliamps at five volts. Because of noise and sometimes encountered non-ideal temperature characteristics (above 70° C.) of some low power op-amps, the processed signal must be sampled using an eight-bit Analog to Digital Integrated circuit or compared with an eight-bit Digital to Analog voltage level. This causes several levels of resolution to be required by the microprocessor in order to decide whether the meter hand was over the pad being excited or not.

At high temperatures (above 70° C.) reading failures have been experienced in some prior art apparatus. At these temperatures, the signal emitted when the meter hand is over a pad and when the meter hand is not over a pad are almost the same. This problem may be corrected by adding additional high performance op-amps to process the signal and setting their individual signal gains lower. Such high performance op-amps are expensive and sometimes difficult to obtain. In some instances, three amplifier stages are required to boost the signal to a point where the frequency corner difference can be measured. A total of seven high performance amplifiers have been used in prior art apparatus for five electric meter dials, assuming that a multiplexer is used after the first stage of amplifiers and before the remaining two amplifiers and an Analog to Digital converter is used to digitize the results.

The prior art SE200 encoder is a practical and workable circuit, but a large number of analog components are required and the PC Board must be carefully routed to limit electrical noise that could interfere with encoding. However, using the technique and apparatus disclosed herein, a number of analog components and amplifiers can be eliminated and reliable high temperature performance, above 70° C., can be obtained. It is sometimes desirable that operation at these high temperatures be achieved, e.g., use of encoders in glass dome enclosed electric meters in the Southwest United States where temperatures are observed in excess of 70° C.

DETAILED DESCRIPTION OF PRIOR ART APPARATUS

Shown by element 1 of FIG. 1, is a cross sectional view of an excitable electrode pad array forming a part of the previously identified prior art Siecor SE200 Encoder. It has a center electrode 2 and guard 3, all on the same surface, disposed between a meter dial face and a rotatable meter hand. Element 1 of FIG. 2 is a plan view of the cross sectional view shown in FIG. 1. Element 6 is a meter backboard and on top of the meter backboard is element 7, a meter dial face. Disposed over meter dial face 7 is plate 8, a substrate. Meter dial face 7 and substrate 8 can be combined on one substrate. On the uppermost surface of substrate 8, there is disposed center electrode 2, guard 3 and center electrode 2. It will be noted that center electrode 2 at least partially circumscribes axle 5 and is spaced apart from axle 5. Spaced apart from center electrode 2 is guard member 3 and spaced apart from guard member 3 is the electrode array 4-1 through 4-10. Note like element numbers of FIG. 2. Excitable electrodes 4-1 through 4-10 represent the ten readable positions that can be read by the encoder. Attached to axle 5 and rotatable about axle 5 is hand 9-10. It will be noted that metal portion of hand 9-10 (the under surface) is spaced apart from axle 5 and its uppermost portion is coated by a plastic or a dielectric 10.

Referring now to the prior art electrode array of FIG. 2, electronic guard 3 is connected to a constant DC voltage (not shown) through leads, X and Z. Lead Y transmits current from center electrode 2 to process circuitry, like that of FIG. 3.

Reference is now made to FIG. 3, showing a prior art encoder circuit (process circuitry). Element 21 is a square wave generator and is connected through leads 22, 23, and 24 and to dials 7, of which there are five in number and have a structure like that of FIGS. 1 and 2. Through leads 25, dials 7 are connected to multiplexer 12. In some instances, amplifiers (op-amps) 11 are inserted between dial 7 and multiplexer 12 as shown. Each dial is connected through leads 26 and 27, to DC reference voltage 20, and to transimpedance amplifier 13 via lead 27. Multiplexer 12 is connected to transimpedance amplifier 13 by lead 28. Bandpass filter 14 is connected through lead 29 to transimpedance amplifier 13. Peak-to-peak detector 15 is connected to bandpass filter 14 through lead 30. Analog to digital converter 16 is connected to the peak-to-peak detector 15 by lead 40 and to microprocessor 17 through lead 41. Smart box 18, a transmitter and receiver, is connected to microprocessor 17 through lead 42 and through lead 43 to central office 19.

The above-described circuit of FIG. 3 works as follows: The transmitter-receiver (smart-box) 18 is adapted to receive a signal from central office 19 and is responsive to the signal to activate the microprocessor 17 to control the AC voltage source 21 so that any given electrode 4-1 to 4-10 of any given dial may be excited upon command. When hand 9-10 is over electrode 4-6 (note FIG. 1), a capacitance is created and proportional current flows off of the center electrode 2, greater than there would have been in the absence of a hand 9-10. DC reference voltage source 20 supplies a steady DC bias voltage (E) to each guard member 3, associated with each dial by means of leads X and Z. By means of transimpedance amplifier 13, voltage (E) is applied to each central electrode. The DC reference voltage source 20 also supplies voltage (E) to the non-inverting input port of the transimpedance amplifier 13. Because of the virtual ground characteristics of transimpedance amplifier 13, the inverting output port of transimpedance amplifier 13 is held essentially at voltage (E). Thus, the negative input port of transimpedance amplifier 13 is at the same voltage as the non-inverting input port. Amplifier 13 is a transimpedance amplifier. Transimpedance amplifiers have the characteristic of reflecting the voltage applied to the reference input, (node 27) at the signal input (node 28). This reflection is demonstrated and disclosed in U.S. Pat. No. 4,924,407 in FIGS. 8 and 9, mare particularly in transimpedance amplifier 44. Here a DC Reference voltage is applied to the non-inverting input of an operational amplifier, and the virtual ground characteristic of the operational amplifier maintains the inverting input voltage at the same potential as the non-inverting input via the feedback resistor connecting the output to the inverting input. This virtual ground characteristic is well know to those or ordinary skill in the art. This function contributes to accomplish the following: Voltage E is applied to node 27. Node 27 is in electrical communication with transimpedance amplifier 13. Transimpedance amplifier 13 reflects the voltage E on node 27 at node 28. Node 28 is in electrical communication with multiplexer 12. Multiplexer 12 is in electrical communication with node 25. Node 25 is in electrical communication with lead Y. Lead Y is in electrical communication with center electrode 2. Thus, voltage E is applied to each central electrode, as multiplexer 12 is operated to choose each central electrode.

Multiplexer 12, under the control of microprocessor 17, (See U.S. Pat. No. 4,924,407) determines which current from which central electrode of which dial is allowed to pass onto lead 28. This current (IX) is the current created by the charge existing between the excited electrode central electrode and hand 9-10. Obviously, IX is changing as the dial hand moves. Current IX passes on to lead 28 through transimpedance amplifier 13, which converts such a current into a low voltage (EX), such voltage arising out of the capacitance coupling of the dial hand and the excited electrode. E is the constant bias voltage applied to the non-inverting input port of transimpedance amplifier 13. The sum of these two voltages appear on lead 29. Band pass filter 14 is used to filter out any noise and the sum of EX plus E, minus the noise, appears on lead 30. Peak-to-peak detector 15 strips out the voltage associated with bias voltage E and converts it to an equivalent analog DC voltage denoted EXPP. Such voltage is the function of the capacitance coupling of meter hand 9-10, center electrode 2, and its associated excited electrode and appears at the analog digital converter 16, which converts it to a microprocessor usable digital word. This digital word is read by a microprocessor 17 and is stored until the same process is performed for all 50 excitable electrode-center electrode pairs, ten pairs per dial and five dials. Microprocessor 17 then processes this information to determine the five dial hand positions (ten positions possible for each dial) for the meters previously described and subsequently transmits this "meter reading" to the "smart box" 18 via lead 42, which in turn transmits the "meter reading" to the central office 19 by means of lead 43. The controller is a smart box, a microprocessor in function. See U.S. Pat. No. 4,924,407 for further details.

The prior art thus described teaches that an unknown capacitance is charged and discharged from a time varying voltage source to a virtual reference node (negative input of a transimpedance amplifier) which is at a constant reference voltage. This technique acts to create a time varying current entering and exiting the virtual reference node. This current is converted to a voltage via the transimpedance amplifier. This voltage is in turn reactivied, filtered to its steady state average value, sampled and converted to a digital representation.

BRIEF DESCRIPTION OF THE INVENTION

The present invention is a humidity and temperature resisting apparatus for determining the orientation of a rotatable meter hand relative to a dial spaced apart from the meter hand. The apparatus creates and depletes a charge between a center electrode, a meter hand, and an outer electrode (a pad) very rapidly to transport electrons through a resistor and a capacitor in parallel combination with one another, attached to a positive power supply, whereby the average current drawn through the resistor and a capacitor combination creates a voltage across the resistor and capacitor combination that corresponds proportionally to the magnitude of the capacitance being measured. The unknown capacitance (spaced apart electrode; meter hand; center electrode measured by the disclosed invention is an electrical series with a resistor capacitor (parallel combination) forming a series circuit. The unknown capacitance is charged through the resistor capacitor and subsequently discharged (not through the resistor capacitor), by operating a combination of switches. During the charging period, this series circuit acts as a voltage divider, where the voltage appearing across the resistor capacitor is a portion of a constant potential source, and is proportional to the unknown capacitance. This voltage across the resistor capacitor is then amplified, sampled and converted to a digital representation.

DETAILED DESCRIPTION OF THE INVENTION

The disclosed invention has many advantages over the prior art in reduced complexity, cost, temperature stability, and noise immunity. It converts the mechanical position of meter hands on gas and electric meters and the mechanical position of gears inside water meters into a digital code, which is equivalent to a reading taken by a "meter reader' and written down on his pad. The digital code can be sent out to a remote or central station over many interfaces. Presently the code can be passed through an inductive Touch-Pad to a hand held Touch-Read gun (BTR-Rockwell) and through a Telephone Interface Unit or TIU-100 (Siecor) directly to the utility's computers over the phone lines.

Figure 1:
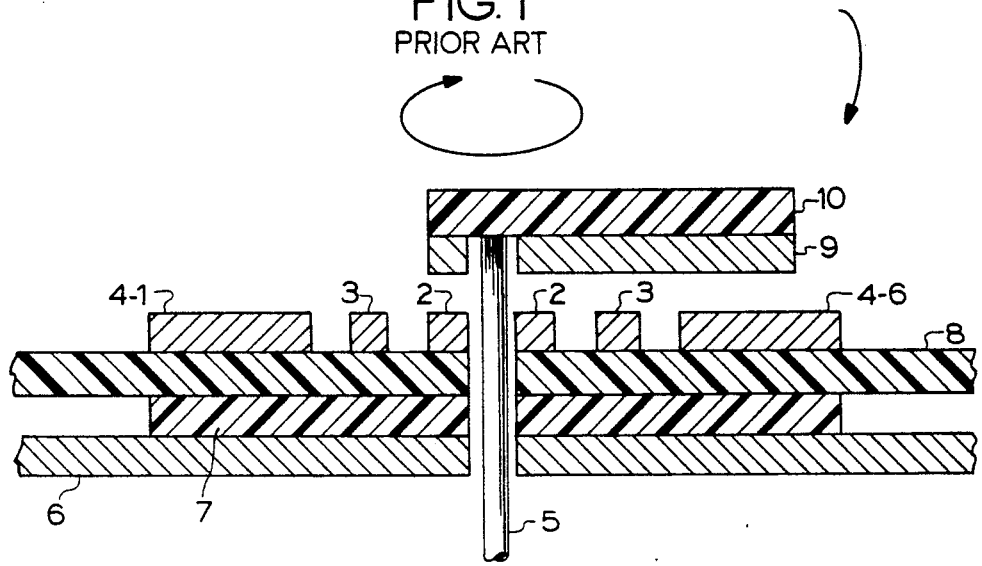
FIG. 1 is a cross sectional view of a prior art excitable electrode (pad) array having a center electrode and a guard, all disposed between a meter dial face and a rotatable member (dial hand).
Figure 2:
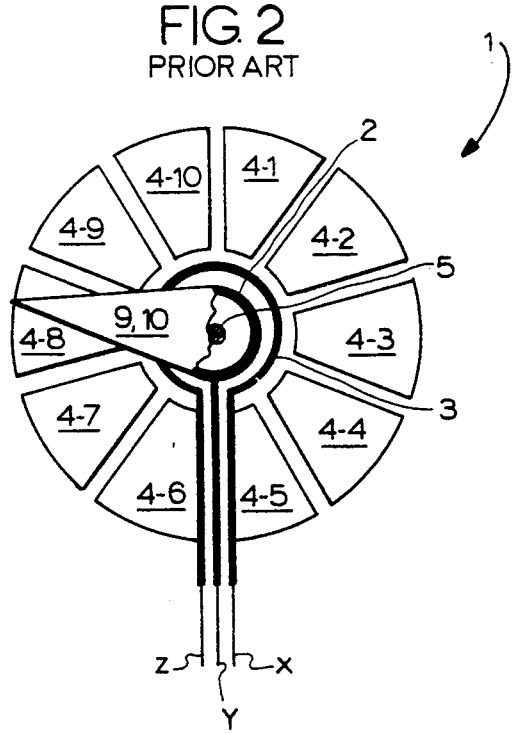
FIG. 2 is a plan view of a prior art single electrode array including a central electrode and a guard.
Figure 3:
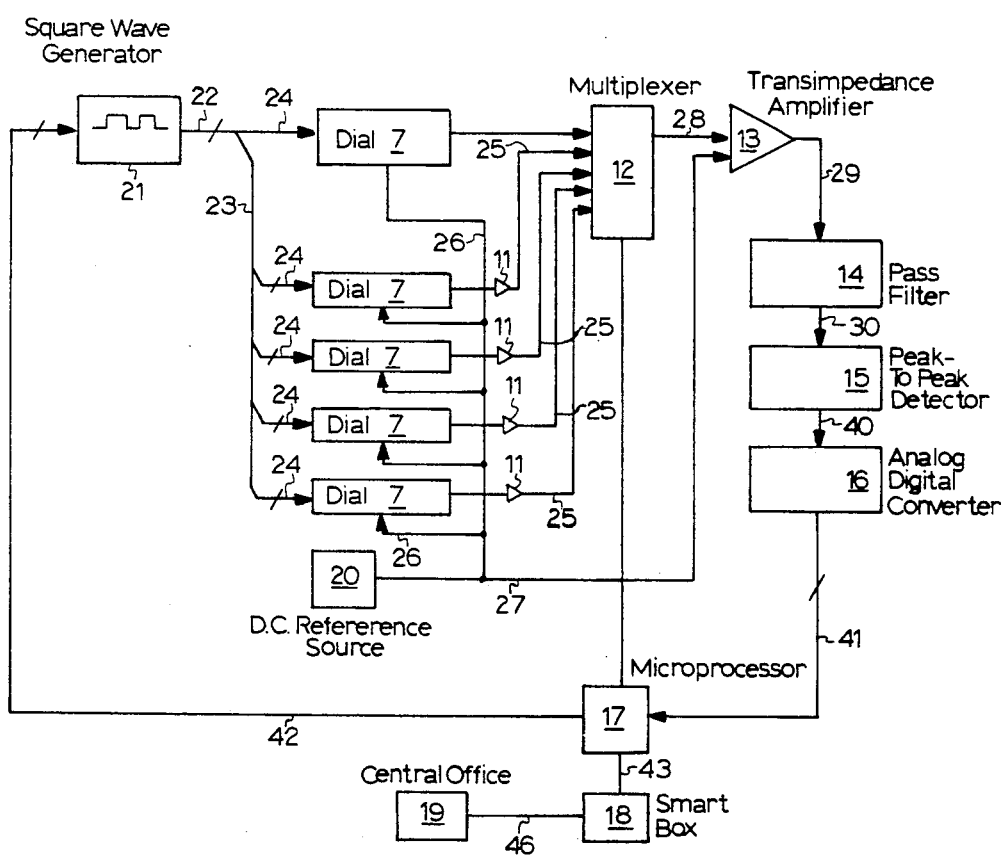
FIG. 3 is a schematic representation of the circuitry employed by prior art encoders.
Figure 4:
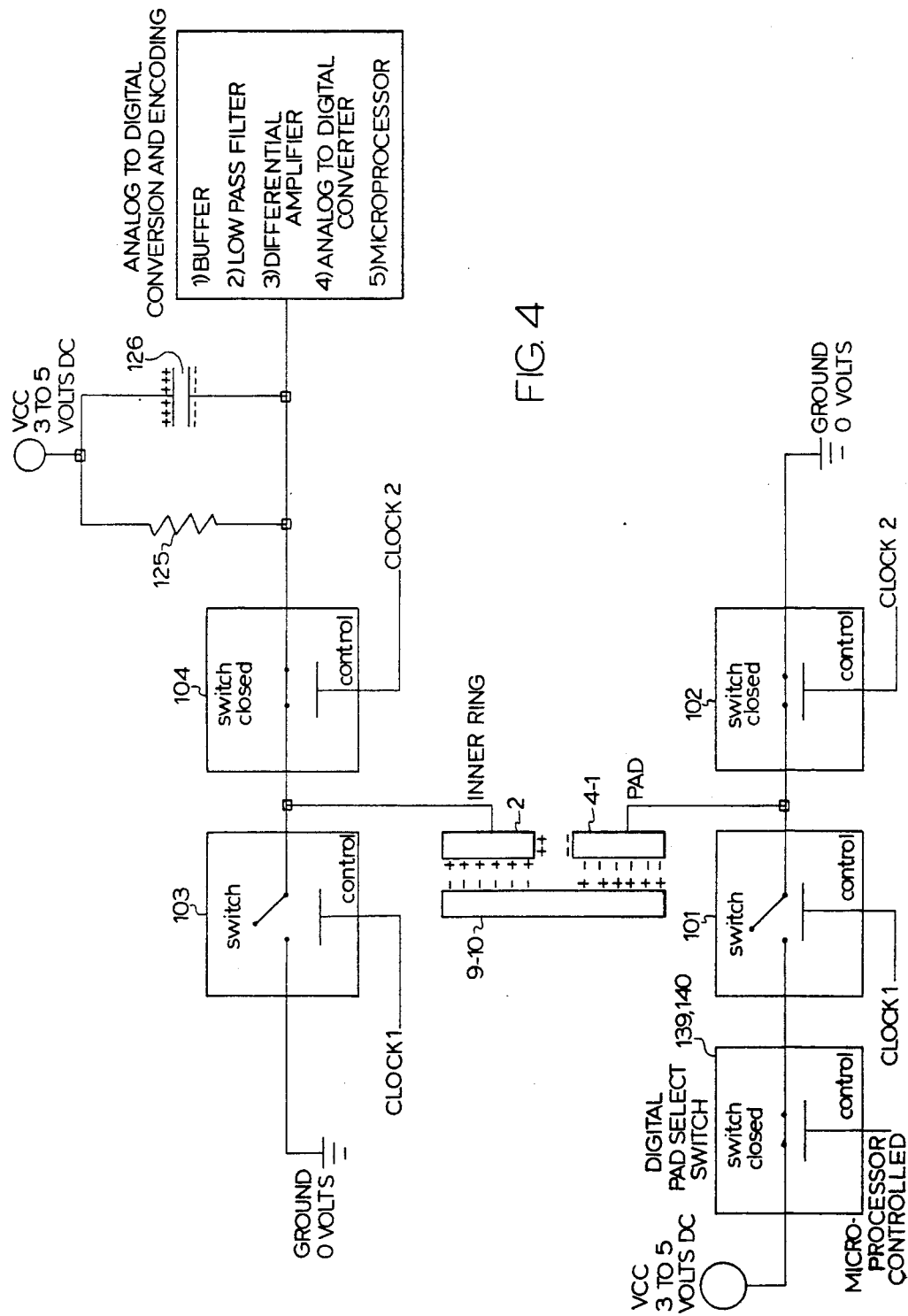
FIG. 4 is a block diagram of the invention with Clock 1 low, Clock 2 high and meter hand over electrode.
Figure 5:
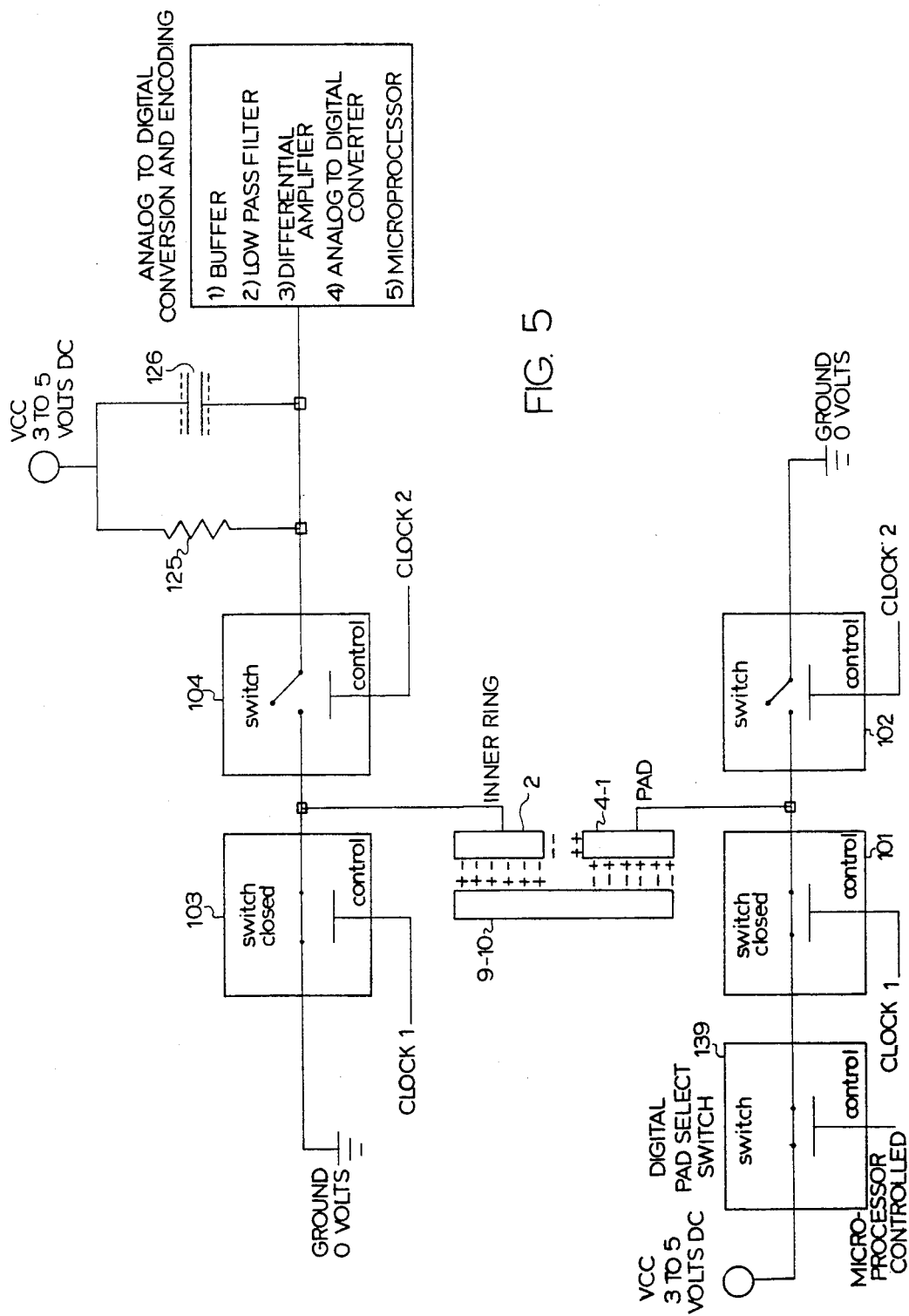
FIG. 5 is a block diagram of the invention with Clock 1 high, Clock 2 low and meter hand oVer electrode.
Figure 6:
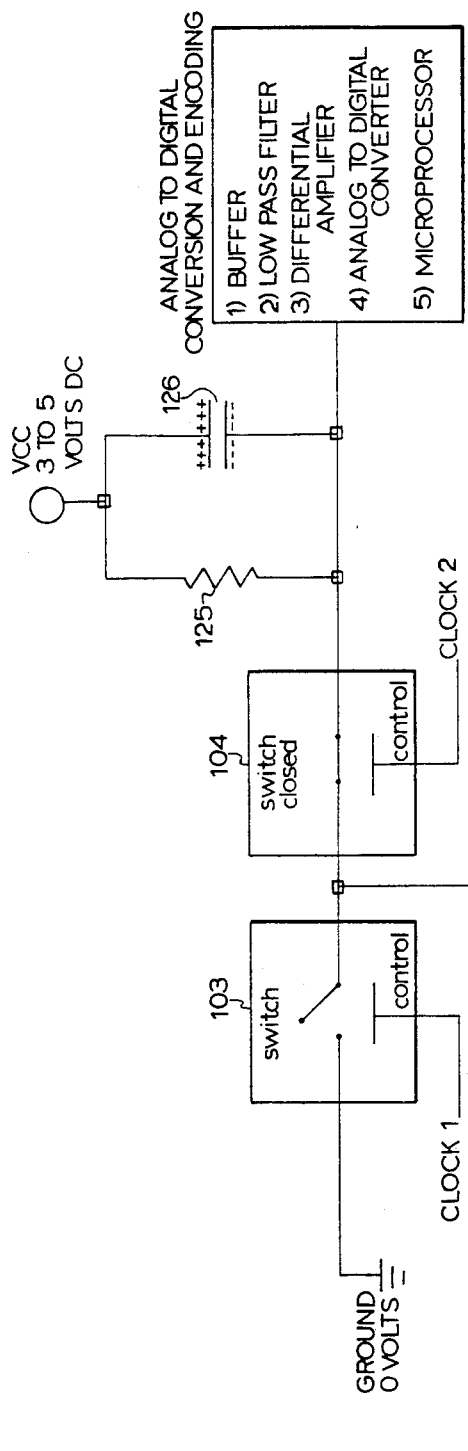
FIG. 6 is a block diagram of the invention with Clock 1 low, Clock 2 high and meter hand not over electrode.
Figure 6:
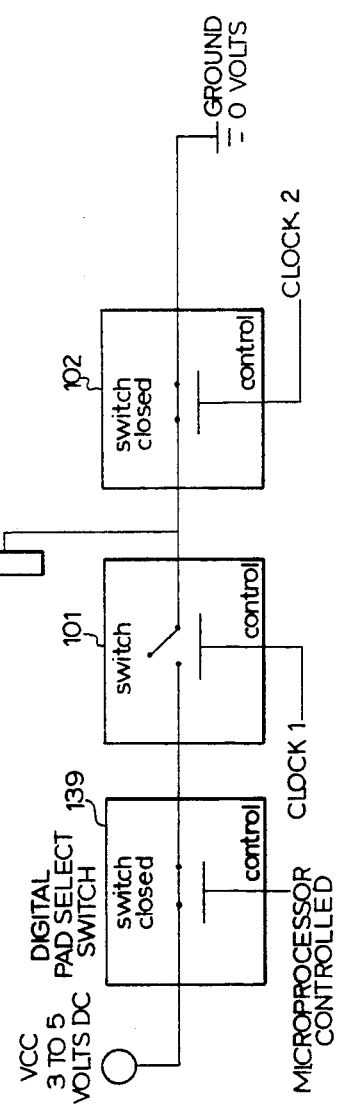
Figure 7:
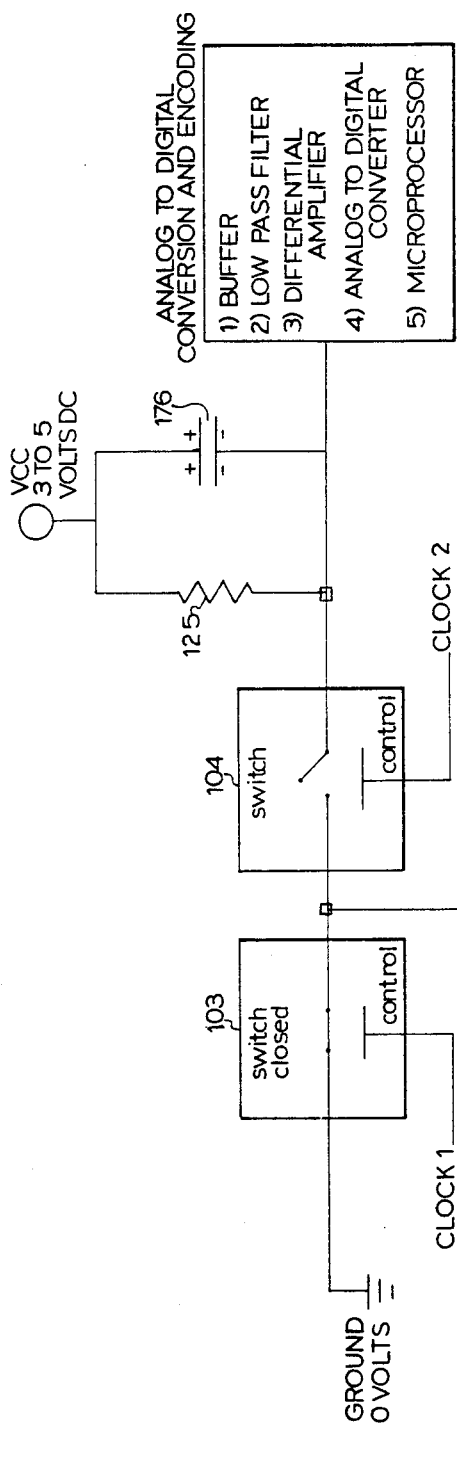
FIG. 7 is a block diagram of the invention with Clock 1 high, Clock 2 low. and meter hand not over electrode.
Figure 7:
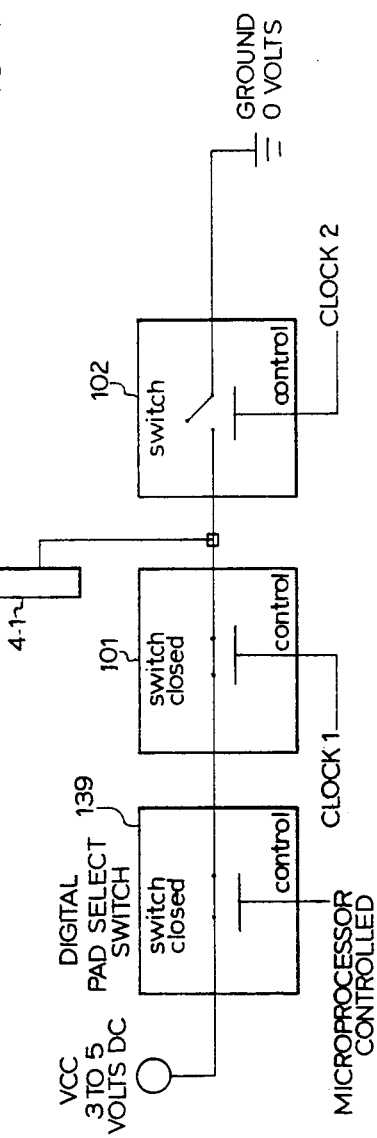

An electric meter, in the general sense, is composed of a large spinning disk and mechanical gears The disk spins in proportion to the rate of eleotricity being consumed by the resident of the dwelling. The spinning disk moves the gears, which are connected to shafts. Each shaft represents one decimal digit of the power consumed since the electric meter was first installed and activated. The shafts may be connected, to plastic collets. The collet is a short plastic insulating tube that mechanically connects the shaft to an aluminum meter hand. The meter hands, being pinned by the collet to a fixed, rotating collet, trace out a circle or dial. Each dial then represents a decimal digit of power consumption. Each dial is numbered from 0 to 9 around its circumference and each number corresponds to and is placed near a metalized area called a pad or electrode. A pad is approximately pie shaped and is connected by metal traces to electronic circuitry. The pads do not extend to a point like a pie piece, but instead are truncated so that there is a circular region in the center of the dial that is not occupied by the pads. The center of the dial, surrounding the shaft hole in the encoder PC board, is a center electrode connected to the encoder circuitry. In this invention, no guard band ring 3 is used as is shown in FIGS. 1 and 2 of a prior art device. A guard band would add additional offset and stray capacitances that are undesired.

The variable capacitor formed by the encoder board's pad 4-1 through 4-10, inner ring 2 and electric meter's hand 9-10 is used not to transmit a high frequency signal, but instead is charged and discharged to transport electrons, drawing electrons on average through resistor 125, attached to a positive power supply (Vcc). See FIGS. 4 through 8a and 8b. The average current being drawn through resistor 125 and capacitor 126 creates a voltage drop across that corresponds proportionally to the magnitude of capacitance that is being measured. In the simplest configuration (see FIGS. 4 through 7) two analog CMOS switches, elements 103 and 104, are attached to the metalized inner ring 2, and two additional analog switches are attached to metalized pad members 4-1 through 4-10. Inner ring 2 is a circular electrode that surrounds plastic post 5 that connects the electric meter rotatable shaft to a aluminum meter hand 9-10. There are 10 metalized meter pads, shaped like teeth with their roots facing inward toward the inner ring. See FIG. 2. The combination of the pads 4-1 through 4-10 and inner ring 2 and elements H0 through H4 of FIG. 8($a$) is called a dial. There are five dials on an electric meter, however, the same circuit and dial structure can be used on water and gas meters, which have between one and eight dials. It is to be understood that dials H0 through H4 are constructed like element 1 of FIGS. 1 and 2 except that guard 3 is deleted.

Switches 101, 102, 103 and 104, inner ring 2 and pads 4-1 through 4-10 are connected according to FIG. 8$a$ and 8$b$. Switches 103 and 104 are connected with their common point attached to inner ring 2 by lead 114. Switch 103 is also connected to ground via lead 115. Clock 1 is connected to switch 103 through AND Gate 117 by lead 18. Clock 2 is connected to switch 104 through AND Gate 118 and lead 119. Switch 104 is connected to second multiplexer 122 and lead 123. For each dial H0, H1, H2, H3 and H4 circuitry like that disclosed in Block B is provided in a manner as above described. AND gates 117 and 118 are connected to first multiplexer 121 via lead 120. Clock 1 is also connected to switch 101 through lead 150 and AND Gate 105, and Clock 2 is connected to switch 102 through AND Gate 106 and lead 113. For each dial H0, H1, H2, H3 and H4 additional circuitry like that disclosed in Block A is provided. For each pad there is an inverter 151 connected to decoder 139 to switch 101 and AND gates 105 and 106.

When switch 103 is closed, electric current will flow from inner ring 2 through switch 103 to ground, until the inner ring's potential is at zero volts, or ground. Switch 104 is connected to registor 125 capacitor 126 combination through multiplexer 122 by leads 123 and 124. Resistor 125 capacitor 126 combination is connected to Vcc or approximately 3 to 5 volts. When switch 104 is closed, electric current flows through resistor 125 into the inner ring electrode 2, until either the inner ring electrode 2 equals Vcc, or more likely, switch 104 is opened again. In normal operation inner ring 2 will never charge to equal Vcc and there will correspondingly be an average voltage drop across resistor 125. The voltage drop across resistor 125 is averaged out by capacitor 126 connected in parallel with it.

Reference is now made to FIGS. 4 through 8a and 8b. Switches 101 and 102 are connected in series, with their common point attached to a pad in the same dial as the inner ring 2 by lead 111. Switch 101 is also connected to Vcc-0.1 V when the circuitry connected to the pad is activated by microprocessor 160. When switch 101 is closed, electric current flows from one side of the switch into the pad, until the pad's electric potential equals Vcc-0.1 V. Terminal of switch 102 is connected to ground. When switch 102 is closed, electric current flows from the pad through the switch to ground, until the pad's voltage potential equals ground.

A capacitor is basically a two electrode device, If one of these electrodes is grounded, the electric charge on this electrode is said to be zero. If a second unconnected electrode, is brought in near proximity to the first electrode, the charges on the first electrode and second electrode do not change. If, however, the second electrode is attached to a source of electrons at a potential above ground, electrons will flow into the second electrode. The closer the second electrode is to the first electrode, the more electrons will be attracted and held by the second electrode by electrostatic forces. The number of electrons that can be attracted is a measure of the magnitude of the capacitance formed between the first and second electrodes. If the electrodes are close together, the electrostatic forces between them will be stronger for a given voltage potential difference. For a larger value of capacitance, more electrons must be attracted to one electrode and pulled off the other electrode to obtain a given voltage potential difference or electrostatic field strength. If the potential is now disconnected from the second electrode, the electrons that were attracted into this electrode continue to be held there. There are a few electrons that jump off of the second electrode and fly toward the first electrode, but the proportion that does is small and is determined by the resistance to electron movement of the material between the electrodes. If the electrode, which is full of excess or free electrons, is connected directly to ground, the free attracted electrons will move rapidly out of the electrode toward ground.

Capacitance is a function of the distance between electrodes and the area of the electrodes. However, to compute capacitance, the distance between every point on each electrode to every other point on the other electrode must be found. Two electrode plates held face to face have a capacitance that is magnitudes greater than two electrodes of the same dimensions and surface area held edge to edge.

The inner and pad electrodes in the present invention are a set distance apart on an encoder PC board, edge to edge metalization areas. Since the distance between the electrodes is inversely proportional to the capacitance, the size of the pads can be smaller than prior art encoders thus increasing the distance between the inner ring and the pads. By increasing the distance, the baseline or minimum capacitance formed is smaller and fewer electrons can be attracted for a given voltage potential across the inner ring and the pads. When a meter hand, made of conducting aluminum or other metallic material, is brought in close proximity to both the inner ring and a pad, it acts as a third electrode that is relatively close to both the inner ring and the pad and faces both. The meter hand is able to increase the capacitance by one to ten percent of the baseline capacitance.

When a pad and inner ring are switched rapidly, many more electrons will pass into and out of the inner ring 2 if a meter hand 9-10 is facing both the inner ring and the selected pad compared to when meter hand is not so located. The electron flow generates an average voltage across resistor 125 capacitor 126 combination, which is buffered by the first stage of unity gain buffer 128, connected to resistor 125 by lead 127. The electron flow is differentially amplified by the second stage of differential amplifier 132 connected to unity gain buffer 128 as shown and then converted into a digital code by the analog to digital converter 138, so that microprocessor 160 can process the results.

A step-by-step outline of operation is given below, followed by a more detailed technical description.

(1) Dial H0's inner ring 2 is selected by sending a digital code from the microprocessor 160 to first and second multiplexers 121 and 122 respectively.
(2) The first pad 4-1 of dial H0 is selected by sending a digital code from microprocessor 160 to the 1 of 10 decoder or directly selecting the pad from the microprocessor 160 I/O ports.
(3) Clock 1 is low, switches 103 and 101 are off or open. Clock 2 is high, switches 104 and 102 are on or closed. (See FIG. 4)
(4) Electrons move from Vcc, through resistor 125 and switch 104 into inner ring 2. More electrons are attracted to inner ring 2 if the meter hand 4-10 is over the selected pad. Electrons move from the selected pad through switch 102 to ground. If given enough time, a charge equal to +Vcc will develop across the inner ring/pad capacitor. However, before this occurs, step (5) is initiated. These moving electrons create a potential drop or difference across resistor 125 and capacitor 126.
(5) Clock 1 is high, switches 103 and 101 are closed. Clock 2 is low, switches 104 and 102 are open.
(6) Electrons stop passing through switch 104 and into inner ring 2. The voltage potential drop across resistor 125 declines slightly as electrons moving through it begin to discharge capacitor 126.
(7) The electron charge built up on inner ring 2 dissipates through switch 103, which has its other side grounded. Electrons move through switch 101, which is connected to a potential of Vcc-0.1V, and into the selected Pad.
(8) Steps (3) to (7) are repeated at half the frequency between 150 KHz and 750 KHz. Above 750 KHz the switches don't completely close or open in the short cycle time. Below 150 KHz the leakage currents flowing through the switches is nearly equal to the current moving into and out of inner ring 2.

(9) An average voltage is developed between resistor 125 and Switch 104 and it is read by first sending it through unity gain buffer 128. Buffer 128 has a high impedance input so that it does not pull much current and adversely affect the voltage being interpreted. The buffered DC voltage is sent through a low pass filter composed of resistor 130 and capacitor 131. The filter reduces any switching noise to a very low level. The filtered DC voltage is then sent into differential amplifier 132, where its constant offset is subtracted and the difference amplified by an order of approximately five. The amplified voltage will be near ground when the meter hand is not over the selected pad, and near Vcc when the meter hand is directly over, and close to the selected pad.

(10) The voltage at the output of differential amplifier 132 is connected to input of analog to digital converter 138, where it is encoded into a digital signal that is recorded by the microprocessor 160.

(11) The next pad on the dial is selected by the microprocessor 160 and steps (3) through (8) are repeated.

(12) The first pad and inner ring on the next dial are selected and steps (3) through (9) are repeated. This step is repeated until all the dials to be encoded have been read.

Figure 9:
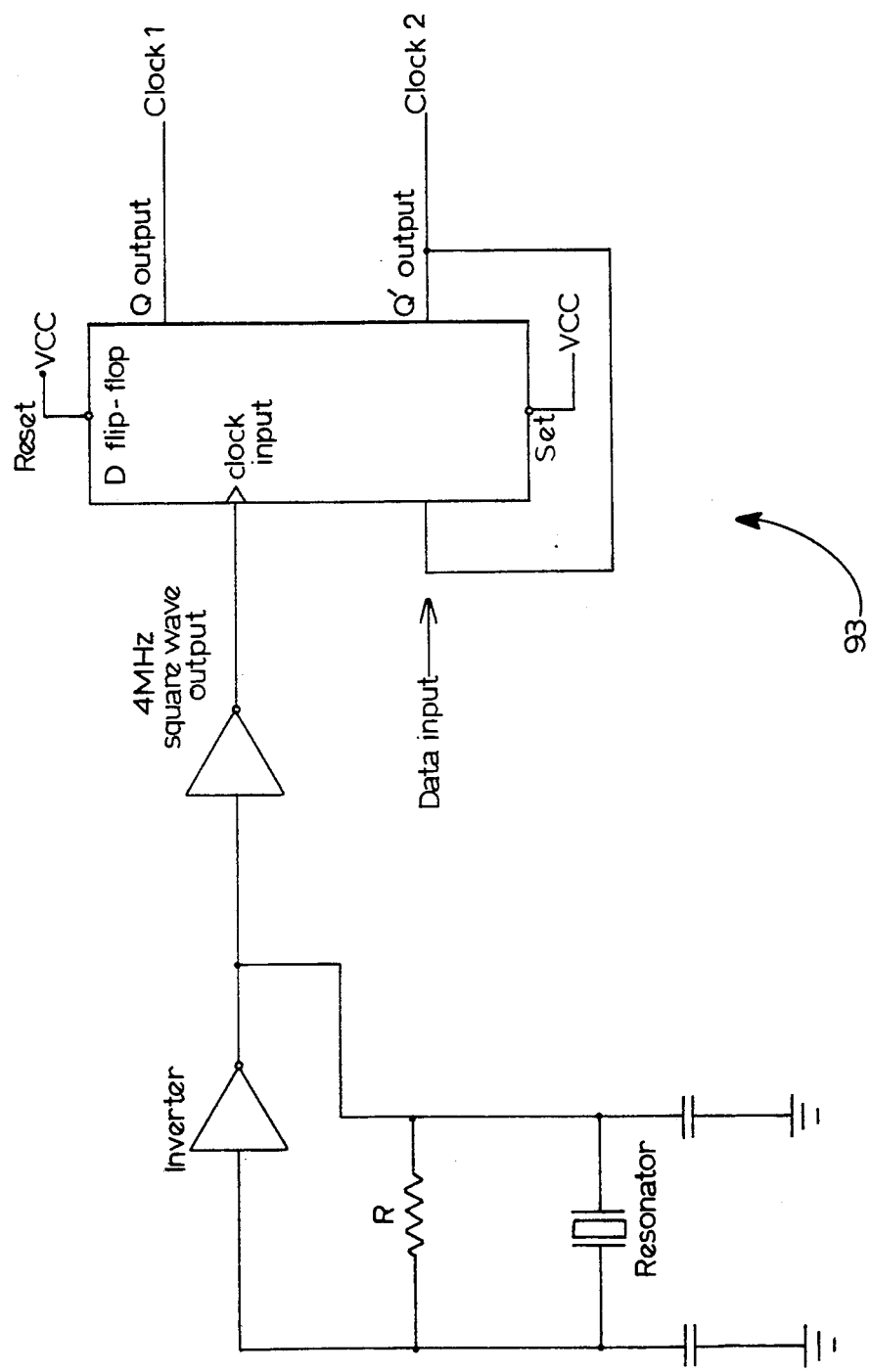
FIG. 9 is a schematic representation of a Dual Phase Clock, used with the invention.

A high frequency square wave generator or clock (doubling a the clock for the microprocessor) 93 is used to turn the switches on and off. See FIG. 9. The clock signal is fed into a D flip-flop, connected in such a way as to produce dual phase clock signals. One resulting clock signal is low while the other one is high. For small capacitances, the simulated resistance of the four switches, inner ring and pad is high and for large capacitances the simulated resistance is low. The end result is a constant analog voltage level corresponding to the size of the variable capacitor created by the meter hand 9-10, pad 4-1 through 4-10 and inner ring or center electrode 2. In the simplest design, there is a pair of switches for each of the ten pads. Like numbered pads on the dials are connected together to reduce the required parts count. The switches connected to the pads are controlled by microprocessor 160 and the dual phase clock of FIG. 9. Microprocessor 160 outputs a digital code to the 1 of 10 decoder, which in turn pulls one of its ten output lines low or near ground. Decoder 139 is connected through inverter 151 to switch 101. The output line 109 is connected through inverter 151 to AND gates 105 and 106 and the input of the CMOS analog switch (switch 101). When microprocessor 160 sends out the code to select a pad, the AND Gates connected to the selected pad's switches are activated so that the dual phase clock signal can control the CMOS analog switches. The unselected pad's CMOS analog switches are not switched, but are left open, in order to reduce leakage currents, stray capacitive effects, and power consumption. The input line of the selected pad's switch 101 is held high so that maximum charging and discharging of the selected pad and inner ring capacitance can occur.

A dial is selected by microprocessor 160, which outputs a digital code to first and second multiplexers 121 and 122 respectively. The digital code selects which of the eight multiplexed lines will be switched or connected to the single, bidirectional output line. Multiplexer 121 is a digital multiplexer; the selected line will have present the same digital value as the common digital signal input line. Multiplexer 122 is an analog multiplexer; the selected line will be internally connected to the common analog signal input/output pin, current moves between the two as if a low value register connected them. Multiplexer 121 activates AND Gates 117 and 118 of the selected dial so that the dual phase clock signals can control the dial's inner ring CMOS analog switches 103 and 104. The unselected dial's inner ring analog switches are not switched, but are left in the open or off state to reduce dial to dial interference and power consumption.

On average, current is pulled through resistor 125, capacitor 126 through switches 103 and 104, with a short stop at the inner ring 2, and then to ground. The average voltage produced between resistor 125 capacitor 126 combination and switch 104 is proportional to the capacitance formed between the pad/meter hand-/and inner ring. In order to reduce the number of resistors, like resistor 125 and capacitors, like capacitor 126, a second multiplexer (8 to 1 analog multiplexer) 122 is used. The same digital code that controls multiplexer 121 above, also controls multiplexer 122. Multiplexer 122 connects resistor 125 and capacitor 126 to the desired dial's switch 104 output so that current can flow through resistor 125 and into the activated dial's switches. To reduce unwanted leakage effects, unity gain buffer 128 (an operational amplifier connected to provide for a high impedance input and a low impedance output) is used to supply the current required by the differential stage without pulling additional current through resistor 125 and offsetting the voltage to be measured.

A low pass filter, composed of resistor 130 and capacitor 131, is used to filter out any noise that passes through unity gain buffer 128. The input to differential amplifier 132 is a smooth DC analog voltage level with little ripple or noise. Differential amplifier 132 is composed of an operational amplifier 134, three resistors 133, 137, 136, and one capacitor 135. The junction between resistor 136 and resistor 137 generates a DC voltage level that is connected to the positive input of op-amp 134. Capacitor 135 filters out any power supply noise and tends to hold the input voltage constant over time. Resistor 133 is a feedback resistor tha allows the output voltage to be approximately five times the difference of the voltages applied at the positive op-amp input terminal and the voltage present at the output of the unity gain buffer. Differential amplifier 132 is used to remove the offset due to leakage currents, stray capacitance and other unwanted but constant effects. Amplification is used so that the DC voltage input to the analog to digital converter 138 will swing widely in proportion to the proximity of the meter hand over the selected pad of the selected dial. Such a large voltage swing ensures that an accurate reading can be made, even in electromagnetically noisy environments. Differential amplifier 132 also greatly reduces 60HZ noise present at the inputs through a process called common mode rejection.

Analog to digital converter 138, is a serial, sample and hold successive approximation, eight bit converter. The input voltage is divided by 256, with each voltage increment assigned an eight bit binary digital code. The output of analog to digital converter 138 is clocked out one bit at a time into microprocessor 160.

Microprocessor 160 scans all of the pads 4-1 through 4-10 on the encoder and stores a digital code representing the capacitance between each pad and inner ring in internal memory. Using software, microprocessor 160 then determines where the meter hands were and codes an ASCII format output, which is sent through a data output line. The data output line can also double as a power input line.

Decoder 139 can be a Motorola 74HC42. Switches 101 and 102 can be Motorola 74HC4066 and AND Gates 105 and 106 can be part numbers 74HC08 by Motorola. Switches 103 and 104 can be the same part numbers as switches 102 and 103 and AND Gates 117 and 118 can be the same part number as AND gates 105 and 106.

First multiplexer 121 can be a Motorola 74HC259 and second multiplexer 122 can be a Motorola 74HC4051. Resistor 125 can be 154K ohms. Capacitor 126 can have a value of 0.1 microfarads. The amplifier of the unity gain buffer can be a Motorola MC33172 and resistor 130 can be a 20K ohm resistor. Capacitor 131 can have a value of 0.001 microfarads. Differential amplifier 132 is made up of an amplifier 134 made by Motorola, part number MC33172. Resistor 137 can have a value of 86.6K ohms. Resistor 136 can have a value of 50K ohms. Resistor 133 can have a value of 100K ohms and capacitor 135 can have a value of 0.1 microfarads. The analog to digital converter 138 can be Motorola part number TLC549 and the microprocessor 160 can be a Motorola 68HC805. It is to be understood that the microprocessor 160 is connected to first and second multiplexers 121 and 122 as well as to decoder 139. Decoder can be Motorola part number 74HC42 and inverter 151 can be Motorola part number 74HC04.

Figure 8A:
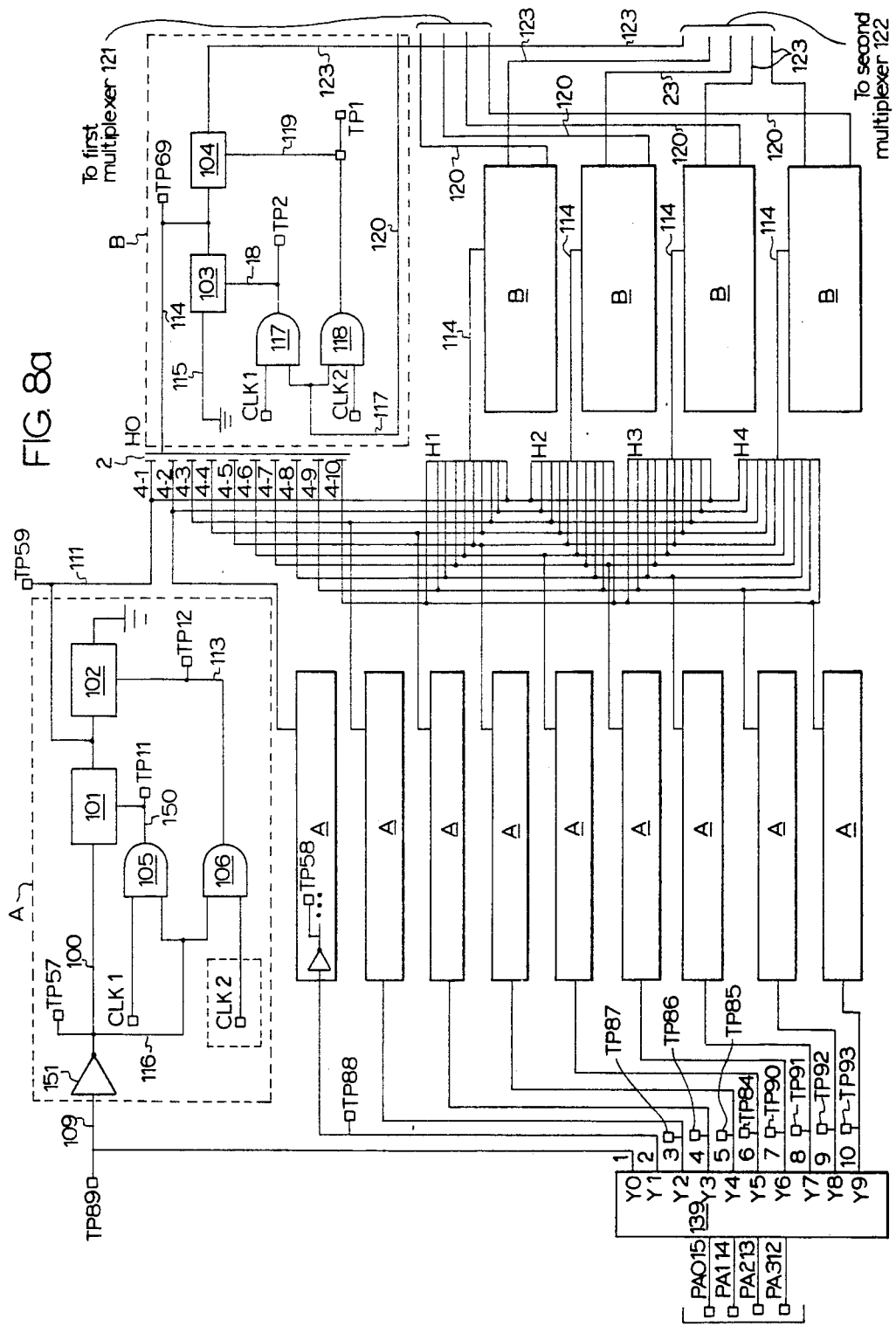
FIG. 8A and 8B when put together result in detailed schematics of the receiver circuit of the invention.
Figure 8B:
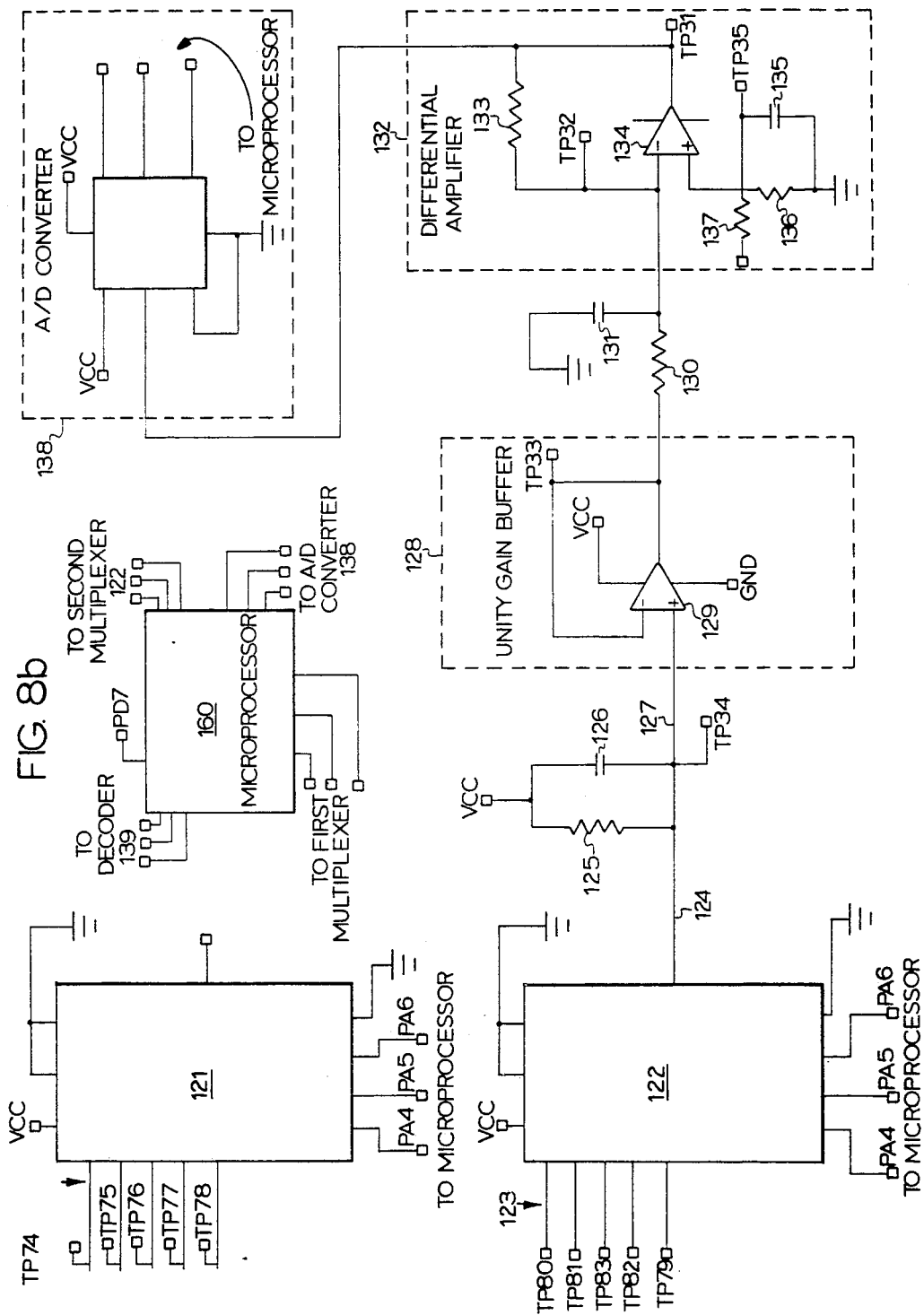

Set forth below is a step-by-step, note by note description of the operation of the circuit shown in FIGS. 8a and 8b:

(1) All inputs to the decoder 139 are set "low" by the microprocessor 160. PA0, PA1, PA2, PA3 are set "low," that is below 0.1 volts. "Low" is equivalent to a digital "0" binary code. If a "0' is applied to a pin, the voltage of that pin is "low." In this case, PA0, PA1, PA2 and PA3 are set to "0000." If they were set to "0101" then PA0 and PA2 would be "low" and PA1 and PA3 would be "high.'

(2) The output pin Y0 of the 1 of 10 Decoder 139, namely, TP89, goes "low," below 0.1 volts.

(3) The output pins Y1 to Y9 of the 1 to 10 Decoder 139, namely pins TP88, TP87, TP86, TP85, TP84, TP90, TP91, TP92, and TP93 all go "high," above VCC −0.1 volts.

(4) The output pin TP57 of inverter 151 goes "high" since the input to inverter 151, namely TP89, is "low."

(5) The inverter output pins TP58 CTC of the balance found in Block "A's" all go "low" because the input pins of these inverters are all "high.'

(6) The input voltage at CMOS analog switch 101 is "high" just like every other pin connected to the node designated TP57. The input voltage to CMOS analog switch analogous switches 101 in blocks A are "low" because their nodes are "low.'

(7) Because one of the inputs to AND Gates 105 and 106 is "high," TP57, clock signals of Clock 1 and Clock 2 can pass through to the output of the AND Gates, TP11 and TP12. The clock signals are digital, non-overlapping, dual phase pulses. If Clock 1 is "high" then Clock 2 is "low" and vice versa.

(8) CMOS analog swich 101 turns "on" when Clock 1 is "on" and turns "off" when Clock 1 is "off." When switch 101 is "on," current flows from TP 57 to TP 59, until TP 57 and TP 59 have the same voltage potential or Clock 1 goes "off." CMOS analog switch 102 turns "on" when Clock 2 is "on" and turns "off" when Clock 2 is "off." When CMOS analog switch 102 is "on," current flows from TP 69 to ground, until TP69 is at the same voltage potential as ground or Clock 2 goes "off.'

(9) The CMOS analog switches in Blocks A are "off", or open, because microprocessor 160 has not give the proper digital signals to the 1 of 10 Decoder 139 to select any of them.

(10) Microprocessor 160 sets its output pins that are connected to multiplexers 121 and 122 to a "low" voltage level. Clocks 1 and 2 are still clocking and the selected CMOS switches are still switching.

(11) Multiplexer 121 digitally connects TP74 to Vcc so that TP74 now has the same voltage as Vcc.

(12) Because TP74 is "high," Clock 1, applied to one of the inputs of AND Gate 117, is now present on the AND Gate output TP2, and the control pin of the CMOS analog switch 103. Clock 2, applied to one of the inputs of AND Gate 118, is now present on the AND Gate output, TP1 and the control pin of the CMOS analog switch 104.

(13) Clock 1 goes "high" and Clock 2 goes "low." The clock signals can be provided by a large variety of different sources in this disclosure and can be produced by a standard flip-flop. A single clock signal is applied to a clock input of the D flip-flop. The D flip-flop data pin is permanently connected to the Q' output pin. In every clock cycle, the two D flip-flop outputs will alternately go "high" or "low." The output Q is the inverse of the output Q'. Clock 1 can either be Q or Q'. Clock 2 is either Q or Q', but cannot be connected to the same output as Clock 1. The clock signal applied to the clock input of the D flip-flop is clocking as long as the encoder unit is powered up. Therefore, Clock 1 and Clock 2 are clocking as long as the encoder unit is powered up.

(14) CMOS analog switch 101, internally connects TP57 with TP59. CMOS analog switch 103 internally connects TP69 with ground. All other CMOS analog switches are "off."

(15) Current flows through switch 103 from the inner ring 2 of Dial H0 to ground.

(16) Current flows through switch 101 from TP57 to TP59 and into pad 4-1 of H0, since the electrons are attracted to the pad by the lower voltage potential, ground inner ring of H0. The other inner rings of the other dials are floating. There is a high impedance path between the inner rings that are not selected in step 10 and ground so very few electrons can flow into or out of them. A voltage potential of approximately Vcc−0.1 volts exists between the selected pad and the inner ringer shortly before Clock 1 changes to a "low" state.

(17) The voltage potential across the capacitor 126 and resistor 125, between TP34 and Vcc, slowly decreases. Since 104 is "off," a high impedance between TP69 and lead 1233 and the "+" input of the unity gain buffer, 128 has a very high impedance, current flowing through resistor 125 flows into the TP34 side of capacitor 126, reducing the charge stored on capacitor 126. The change in charge stored in capacitor 126, and thus the voltage across the parallel combination of capacitor 126 and resistor 125, is termed electrical noise that requires the low pass filter to reduce to an acceptable level so that only the average voltage across resistor 125 is detected.

(18) Clock 1 goes "low" and Clock 2 goes "high."
(19) CMOS analog switches 101 and 103 both turn "off," internally disconnecting TP69 from ground and TP57 from TP59.
(20) CMOS analog switches 102 and 104 both turn "on," internally connecting TP69 to TP80 and TP59 to ground.
(21) Current flows from Vcc, through resistor 125 to TP34 to TP80 to TP69 and into the inner ring 2 of dial HO. Since multiplexer 122 has pins PA4, PA5, and PA6 set to "000," TP80 and TP34 are internally connected. The voltage potential between the inner ring and the selected pad increases until Clock 1 goes "high" and Clock 2 goes "low."
(22) Current flowing through resistor 125 creates a voltage potential difference between Vcc and TP34. TP34 is at a voltage that is, on average over time, proportional to the capacitance formed between the selected pad, meter hand, and the selected dial's inner ring.
(23) Capacitor 126 charges to a level equal to the potential difference across 125.
(24) The voltage at TP34 is sensed by the "+" input of the unity gain buffer. The output of the unity buffer, TP33, then equals the voltage at the "+" input at TP34.
(25) The voltage at TP35 remains constant throughout the operation of the device. Capacitor 135 damps out any noise that is present between TP35 and ground.
(26) The unity gain buffer 128 output supplies current to resistor 130 in order to maintain the voltage of TP33 and TP34 at the same level. The current flows through TP32 and through resistor 133 to the output of differential amplifier 132, namely, TP31. The voltage output is equal to the voltage at TP33 minus a voltage offset that is created by the voltage divider made up of resistors 137 and 136 multiplied by a factor equal to the value of resistor 133 divided by the value of resistor 130. The voltage is amplified so that the voltage noise at the input of the analog digital converter is a much smaller fraction of the total voltage than it would be without any amplification. Amplification also increases the smallest voltage difference that the A/D must detect, increasing the accuracy of the A/D conversion.
(27) The output of the differential amplifier 138, TP31 is applied to the "IN" input of the analo digital converter 138.
(28) The steps 13 through 27 are repeated at a constant frequency between 150 KHz to 500 KHz for a specified period of time. Microprocessor 160 has an internal counter loop that it increments for each of its clock cycles until the counter loop value equals the preset value. When the time interval is up, the analog to digital converter's last reading is held and the microprocessor 160 clocks the bits out in serial fashion through a data output pin, PD7. The interval is required so that an accurate average voltage will be present at the input to the analog digital converter 138.

To set forth a detail step-by-step process for each pad 4-1 through 4-10 and each dial HO through H4 it is believed to be unnecessary in view of the foregoing enclosure and that which follows. The behavior of the unity gain buffer, differential amplifier, multiplexers, CMOS analog switches, AND Gates and the analog digital converter is the same as for the steps outlined below as they were for the reading of the first pad 4-1 on the first dial HO as above explained.

When the inner ring 2 of dial HO is selected, microprocessor 160 outputs "000" to the multiplexers 121 and 122, PA4, PA5, and PA6. TP74 goes "high." TP80 is connected to TP34. TP75, TP76, TP77, TP78 and TP81, TP83, TP82 and TP79 have a high impedance to ground. AND Gates 117 and 118 will pass Clock 1 and Clock 2 to the respective CMOS analog switches. Since a "low" is present at one of the inputs of CMOS switches of Blocks B, they block Clock 1 and Clock 2 of the respective CMOS analog switches. Inner ring 2 of dial HO will be selected until all ten pads have been individually selected.

If pad 4-1 is selected, microprocessor 160 outputs "000" to the 1 of 10 decoder 139, PA0, PA1, PA2, and PA3. TP57 goes "high." TP58 of Blocks B go "low." Switches 105, 106, 117 and 118 control CMOS analog switches 101, 102, 103 and 104 respectively.

After a set amount of time is passed, the analog digital converter 138 is read by the microprocessor 160. The digital code representing the output voltage of the differential amplifier 132, is stored in microprocessor's 160 memory. The voltage of TP31 is proportional and varies linearly with the amount of capacitance between the selected pad and the inner ring. If the meter hand were over the selected pad, the capacitance would be greater than if it had not been over the selected pad.

If pad 4-2 and 4-3 are selected, a similar process takes place. Pads 4-4 through 4-10 are each individually selected as described above. Each pad is selected by applying a unique digital code to the 1 of 10 decoder 139. After each pad is selected, the selected pads and selected dial's inner rings CMOS analog switches switch at the clock frequency of Clock 1 and Clock 2. A set time elapses after the next pad is selected and the analog digital converter 138 is read by microprocessor 160. Each analog digital converter reading made by microprocessor 160 is stored in its internal memory. Once all the remaining pads have been selected, the next step occurs.

The inner ring 2 of dial H1 is selected by the microprocessor 160. Microprocessor 160 sets PA4, PA5, and PA6 to "001," which are connected to multiplexers 121 and 123 as above described. Multiplexer 121 applies ground to TP74 and applies Vcc to TP75. Multiplexer 122 internally disconnects TP80 from TP34 and connects TP81 to TP34. All other input pins have a high impedance path to the output as in step 1 above.

Each pad is selected sequentially as described above. Each time the analog digital converter 138 is read by the microprocessor 160 the results are stored in internal memory in the microprocessor 160.

The internal ring of the next dial H2 is selected and the above steps are repeated until all dials have been selected and read.

All pad inner ring capacitance readings for each dial, stored in microprocessor 160 memory, are compared to determine the position of the meter hand on that dial. The meter hand positions correspond with the reading denoting the largest capacitance formed between the inner ring and the selected pads on each dial. When computing, ambiguity may exist if the meter hand on a dial is between two pads. If this is the case, a simple look at the previous dial's meter hand location will give the required additional information to accurately read the position of the meter hand in question. If there is not a previous dial to look at, a simple rule is used to decide between the two pads. This possible one digit error on the least significant dial is noncumulative, not added to the next meter reading.

What is claimed is:

1. An apparatus for remotely monitoring the position of a meter hand affixed to an axle, as the meter hand is rotated by the axle comprising:
   (a) an array of spaced apart electrodes disposed on a surface of a substrate delimiting a center portion, an aperture in said substrate located in said center portion for receiving said axle, a center electrode disposed on said surface circumscribing said aperture and spaced apart from said array of spaced apart electrodes, said meter hand being spaced apart from said array of spaced apart electrodes and said center electrode, any one of said array of spaced apart electrodes in combination with said center electrode and meter hand forming a capacitor;
   (b) first and second analog switches in electrical communication with each other and one of said spaced apart electrodes;
   (c) third and fourth analog switches in electrical communication with each other and said center electrode;
   (d) a source of constant potential, a resistor and capacitor combination in parallel connection with one another, said resistor and capacitor combination in electrical communication with said fourth switch and said source of constant potential whereby current flowing through said resistor and capacitor combination is proportional to the capacitance formed by any one of said spaced apart electrodes, said center electrode and said rotatable member; and
   (e) a differential amplifier and analog to digital converter, said differential amplifier connected to said analog to digital converter and in electrical communication with said resistor.

2. The apparatus of claim 1 further including a microprocessor, said microprocessor connected to said analog to digital converter and in electrical communication with said first switch.

3. The apparatus of claim 1 further including a unity gain buffer connected to said resistor and in electrical communication with said differential amplifier.

4. The apparatus of claim 3 further including a low pass filter in connection with said unity gain buffer and said differential amplifier.

5. The apparatus of claim 1 further including first and second clocks, said first clock in electrical communication with said first analog switch and said second clock in electrical communication with said second switch.

6. The apparatus of claim 5 wherein said first clock is in electrical communication with said third analog switch and said second clock is in electrical communication with said fourth analog switch.

7. The apparatus of claim 6 further including a micro, processor and a first multiplexer, said first multiplexer in electrical communication with said third and fourth switch and said microprocessor is connected to said first multiplexer and in electrical communication with said first switch.

8. The apparatus of claim 6 further including a second multiplexer, said second multiplexer connected to said resistor and to said fourth switch.

9. The apparatus of claim 8 further including a microprocessor, said microprocessor is connected to said second multiplexer and is in electrical communication with said first and second switch.

10. The apparatus of claim 9 further including a decoder, said decoder connected to said microprocessor and in electrical communication with said first and second switches.

11. The apparatus of claim 5 further including first and second AND gates, said first AND gate connected to said first clock and said first switch and said second AND gate connected to said second clock and said second switch.

12. The apparatus of claim 6 further including third and fourth AND gates, said third AND gate connected to said first clock and to said third switch and said fourth AND gate connected to said second clock and to said fourth switch.

* * * * *